US008628258B2

(12) United States Patent
Vogt

(10) Patent No.: US 8,628,258 B2
(45) Date of Patent: Jan. 14, 2014

(54) TRIPOD HEAD

(76) Inventor: Philippe Vogt, Bussieres (FR)

(*) Notice: Subject to any disclaimer, the term of this patent is extended or adjusted under 35 U.S.C. 154(b) by 0 days.

(21) Appl. No.: 13/809,782

(22) PCT Filed: Jun. 15, 2011

(86) PCT No.: PCT/EP2011/059974
§ 371 (c)(1),
(2), (4) Date: Jan. 11, 2013

(87) PCT Pub. No.: WO2012/007244
PCT Pub. Date: Jan. 19, 2012

(65) Prior Publication Data
US 2013/0108255 A1    May 2, 2013

(30) Foreign Application Priority Data

Jul. 14, 2010   (DE) .......................... 10 2010 036 405

(51) Int. Cl.
*G03B 17/56*       (2006.01)
*F16M 11/12*      (2006.01)

(52) U.S. Cl.
USPC ..................... 396/428; 248/179.1; 248/187.1

(58) Field of Classification Search
USPC .................. 396/428; 248/178.1, 187.1, 183.4
See application file for complete search history.

(56) References Cited

U.S. PATENT DOCUMENTS

| 2,671,392 A | 3/1954 | Robins |
| 2,840,334 A | 6/1958 | Cauthen |
| 3,006,052 A | 10/1961 | Stickney et al. |
| 3,123,330 A * | 3/1964 | Forbes-Robinson ....... 248/183.2 |
| 3,128,982 A * | 4/1964 | Christopher ............... 248/183.2 |
| 3,612,462 A | 10/1971 | Mooney et al. |
| 3,737,130 A | 6/1973 | Shiraishi |
| 3,782,671 A * | 1/1974 | Igwe ......................... 248/183.4 |
| 3,855,602 A | 12/1974 | Hoos |
| 4,256,279 A | 3/1981 | Duel |
| 4,319,825 A | 3/1982 | Newton |
| 4,473,177 A | 9/1984 | Parandes |

(Continued)

FOREIGN PATENT DOCUMENTS

| CN | 101598886 | 12/2009 |
| DE | 817037 | 10/1951 |

(Continued)

OTHER PUBLICATIONS

English translation of International Preliminary Report on Patentability from corresponding International Application PCT/EP2011/059974.

(Continued)

*Primary Examiner* — Clayton E Laballe
*Assistant Examiner* — Leon E Rhodes, Jr.
(74) *Attorney, Agent, or Firm* — Gardner, Linn, Burkhart & Flory, LLP

(57) ABSTRACT

A holder for an optical device for changing the orientation of the optical device, such as for photographic, video or film cameras, having a first component having a first pivot axis for connecting to a tripod and a second component having a second pivot axis for connecting to the optical device, wherein the two pivot axes extend transversely with respect to each other and can each be adjusted in a mutually independent manner, wherein the first pivot axis is arranged in the first component and the second pivot axis is likewise arranged in the first component.

18 Claims, 6 Drawing Sheets

(56) References Cited

U.S. PATENT DOCUMENTS

| | | |
|---|---|---|
| 4,752,794 A | 6/1988 | Bohannon |
| 5,072,907 A | 12/1991 | Vogt |
| 5,074,662 A | 12/1991 | Sullivan |
| 5,098,182 A * | 3/1992 | Brown .................. 352/243 |
| 5,322,251 A | 6/1994 | Schumer et al. |
| 5,589,903 A | 12/1996 | Speggiorin |
| 5,737,657 A | 4/1998 | Paddock et al. |
| 5,806,734 A | 9/1998 | Scott |
| 5,870,641 A | 2/1999 | Chrosziel |
| 5,908,181 A | 6/1999 | Valles-Navarro |
| 6,042,277 A | 3/2000 | Errington |
| 6,435,738 B1 | 8/2002 | Vogt |
| 6,663,299 B1 | 12/2003 | Shupak |
| 6,773,172 B1 | 8/2004 | Johnson et al. |
| 6,827,319 B2 | 12/2004 | Mayr |
| 6,988,846 B2 | 1/2006 | Vogt |
| 7,178,997 B2 | 2/2007 | Claudi et al. |
| 7,185,862 B1 | 3/2007 | Yang |
| D591,325 S | 4/2009 | Dordick |
| 7,588,376 B2 | 9/2009 | Friedrich |
| 7,823,316 B2 | 11/2010 | Storch et al. |
| 8,075,203 B2 | 12/2011 | Johnson |
| 8,109,681 B2 | 2/2012 | McAnulty |
| 8,267,361 B1 * | 9/2012 | Dordick .................. 248/181.1 |
| 2002/0126110 A1 | 9/2002 | Bowron |
| 2003/0194268 A1 | 10/2003 | Vogt |
| 2005/0041966 A1 | 2/2005 | Johnson |
| 2006/0098118 A1 | 5/2006 | Wasada |
| 2006/0177215 A1 | 8/2006 | Johnson |
| 2007/0031143 A1 | 2/2007 | Piccardi |
| 2007/0230946 A1 | 10/2007 | Kimura |
| 2008/0151483 A1 | 6/2008 | Holbrook et al. |
| 2010/0092165 A1 | 4/2010 | Cartoni |
| 2010/0181454 A1 | 7/2010 | Vogt |
| 2011/0006170 A1 | 1/2011 | Liu |
| 2012/0145864 A1 | 6/2012 | Vogt |
| 2012/0281976 A1 | 11/2012 | Vogt |

FOREIGN PATENT DOCUMENTS

| | | | |
|---|---|---|---|
| DE | 7235189 | 3/1974 | |
| DE | 2944351 | 5/1980 | |
| DE | 8609247 | 12/1987 | |
| DE | 19521710 A1 | 1/1996 | |
| DE | 29613027 | 11/1996 | |
| DE | 20203018 | 5/2002 | |
| DE | 202 11 351 | 1/2003 | |
| DE | 10329224 | 10/2005 | |
| EP | 0323550 | 7/1989 | |
| EP | 0349948 A1 | 7/1989 | |
| EP | 0974862 | 7/1998 | |
| EP | 1160499 | 12/2001 | |
| EP | 1365187 | 11/2003 | |
| EP | 0982613 | 1/2004 | |
| EP | 1657484 | 5/2006 | |
| EP | 1893906 | 8/2008 | |
| EP | 2172686 | 4/2010 | |
| GB | 190152 | 5/1928 | |
| GB | 2291468 | 1/1996 | |
| JP | 2009296349 A * | 12/2009 | ............ H04N 5/225 |
| WO | WO 2008028351 | 3/2008 | |

OTHER PUBLICATIONS

International Search Report and Written opinion mailed Jul. 25, 2011 in corresponding International Application PCT/EP2011/059974.
Translation of International Search Report from Corresponding International Application PCT/EP2011/059974.
Really Right Stuff: Catalogue 2009 [Online] URL:http:reallyrightstuff.com/mmRRS/Others/ReallyRightStuff2009.pdf.

* cited by examiner

TRIPOD HEAD

BACKGROUND OF THE INVENTION

The invention relates to a holder for an optical device for changing the orientation of the optical device, in particular for photographic, video or film cameras, having a first component having a first pivot axis for connecting to a tripod and a second component having a second pivot axis for connecting to the optical device.

Such holders are also referred to as three-way heads. A three-way head is a tripod head for photographic tripods, i.e., a holder for an optical device, in particular for photographic, video or film cameras, by means of which the optical device is fastened to the tripod and the orientation of the optical device can be set or changed. A three-way head can be independently adjusted in three axes. The tripod head can be pivoted horizontally, inclined up and down and tilted sideways.

A specific form of the three-way head is the geared tripod head. Geared tripod heads are tripod heads having a gear drive for adjusting the three axes. They are advantageous compared with conventional three-way tripod heads in that each axis thereof can be set in a simple, stable and in particular more precise manner. Setting using self-locking gear, drives protects heavy camera constructions from falling or being lowered. The precise adjustability is a decisive advantage in particular for exact orientation of view cameras and for precisely matching up the individual photographs in panoramic photography.

Geared tripod heads are available inter alia from the companies Manfrotto (400 series) and Arca Swiss (Cube C1). The Arca Swiss Cube C1 is apparent inter alia from EP 0 974 862 B1.

The previously available models are relatively large in construction and are also heavy. Furthermore, the holding force thereof relative to the size and weight is low in comparison with ballhead tripod heads.

SUMMARY OF THE INVENTION

The object of the present invention is to provide a tripod head which is compact and light and has a high holding force.

This object is achieved by the tripod head provided in accordance with the present invention.

Since the holder for an optical device for changing the orientation of the optical device, in particular for photographic, video or film cameras, having a first component having a first pivot axis for connecting to a tripod and a second component having a second pivot axis for connecting to the optical device, wherein the two pivot axes extend transversely, in particular at a right angle, with respect to each other and can each be adjusted in a mutually independent manner, wherein the first pivot axis is arranged in the first component and the second pivot axis is likewise arranged in the first component, it is possible to provide a particularly compact and low-weight holder.

The optical device is thus mounted on the second component, possibly using a known rotatable quick clamping unit, and the holder in its own right is connected to the tripod etc. via the first component.

In one embodiment, the first component is a cylindrical component, i.e., a substantially cylindrical part.

It is then expedient if the first pivot axis extends through the longitudinal centre axis of the cylindrical component.

If the first component can be connected to the tripod via a third component having a third pivot axis, a further degree of freedom of the adjustment is permitted. Preferably, this is a "panning base", i.e., a lockable rotary plate which can be rotated through 360 degrees.

A particularly compact unit is produced when the second component is mounted to be pivotable about the second pivot axis in the first component. In addition, the first component can be mounted to be pivotable about the first pivot axis in the third component.

In a particular variation of the invention, the first and second components can be adjusted about the respective pivot axis in a mutually independent manner in each case via a drive. The holder is then a geared tripod head. For this, it is preferable if the drives are formed by worm gears which comprise a worm which acts upon a worm wheel which rotates about the respective pivot axis. The worm wheel (or toothed wheel) is in operative connection, or can be brought into operative connection, with the component (depending upon the state of the decoupling mechanism, see below). Therefore, a precise adjustment or orientation of the optical device with respect to the tripod can be achieved. Preferably, it is a self-locking worm gear.

In a particular embodiment the drive for the second pivot axis lies on the longitudinal centre axis of the cylindrical component. The drive for the second pivot axis may extend along the first pivot axis such that the holder can be designed in an even more compact manner and pleasing symmetry can be obtained.

In particular, the distance between the two pivot axes is particularly small. In addition to the particular compact design, this also brings about a reduction in the lever which means that the forces to be applied and compensated for are smaller and with this the deviation of the optical device during adjustment is also smaller and thus more precise.

In order to ensure that the worm gear does not have to be used for large adjustment paths, it is expedient if the holder allows a "free" adjustment in the manner of a three-way head. For this, it is preferable if the drives are provided in each case with a decoupling mechanism. In a particular embodiment, the decoupling mechanism includes a cone, connected to the component along the pivot axis, having a pin, wherein the worm wheel of the drive has a central opening which, on the side facing towards the cone, has an internally circumferential inclined surface corresponding to the cone and the pin engages through the worm wheel and engages into a control button on the side facing away from the cone, which button displaces the toothed wheel and the cone relative to one another to bring the worm wheel into or out of engagement with the cone.

This mechanism allows decoupling in any position or location without tedious screw actuations or clamping levers being required for this purpose.

In a particular embodiment, the pin in the case of the decoupling mechanism of the drive for the second component is a spindle.

In a further embodiment, the cone and the pin in the case of the decoupling mechanism of the drive for the first component are formed by the component itself.

It is expedient if the internally circumferential inclined surface of the toothed wheel and the cone are provided with mutually corresponding toothed arrangements so that during inter-engagement a rotationally-fixed connection is achieved in order to prevent "slippage".

In a second variation of the invention, the components for fixing their location about the pivot axes are each provided with a locking mechanism which includes a cone, connected to the component along the pivot axis, having a pin and includes a friction wheel, wherein the friction wheel has a central opening which, on the side facing towards the cone, has an internally circumferential inclined surface corresponding to the cone and the pin engages through the friction wheel and engages into a control button on the side facing away from the cone, which button displaces the cone and the friction wheel relative to one another to bring the friction wheel into or out of engagement with the cone.

This variation is thus a "normal" tripod head without a drive. In contrast to the first variation, as it were the drive has thus been removed and the toothed wheel of the drive has been replaced with a friction wheel. The remaining components correspond to each other.

It is thus clear that the decoupling mechanisms and the locking mechanisms can correspond with each other with the exception of the toothed wheel/friction wheel.

The advantages already mentioned above are thus produced.

Further details, features and advantages of the invention will be apparent from the following description of an exemplified embodiment with the aid of the accompanying drawings.

DESCRIPTION OF THE PREFERRED EMBODIMENTS

Figure 1:
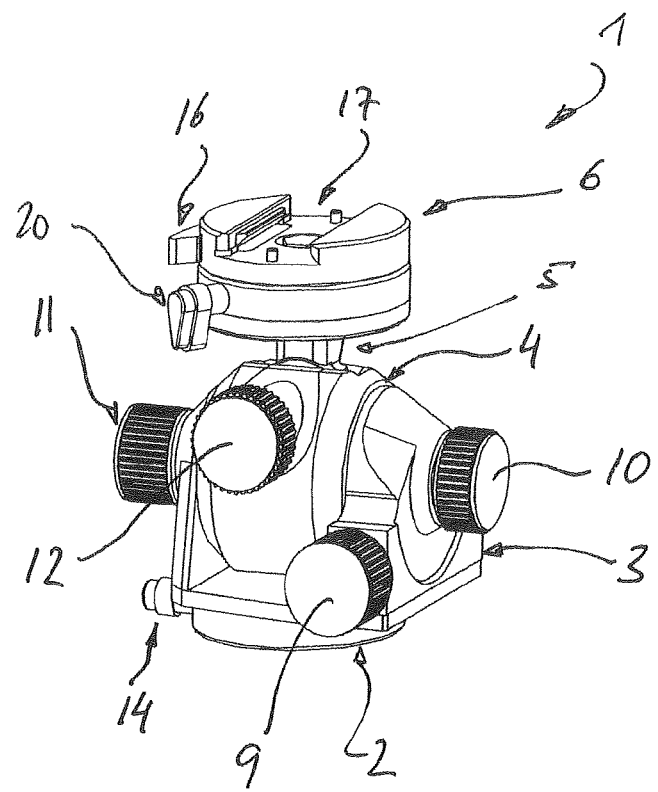
FIG. 1 is a schematic, perspective view of a tripod head.
Figure 2:
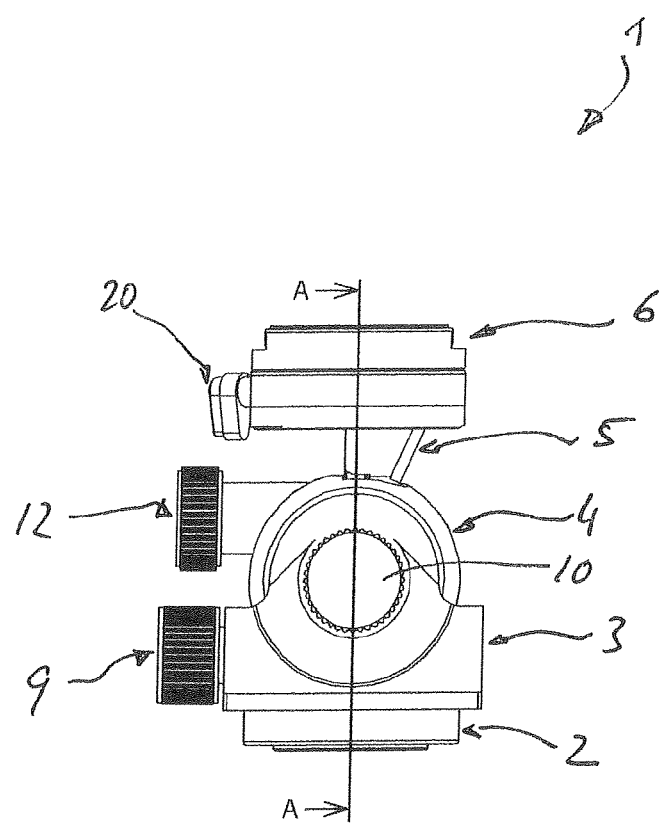
FIG. 2 is a side view of the tripod head of FIG. 1.

The tripod head is designated as a whole with reference numeral 1 in the figures. It is used as a holder for a photographic camera and thus for the fixing thereof to a tripod.

For connecting to a tripod, the holder 1 includes a rotary plate 2 which can be connected to the tripod in a known manner via a screw thread. The 360 degree rotation can be fixed in any position via a locking lever 14.

Figure 3:
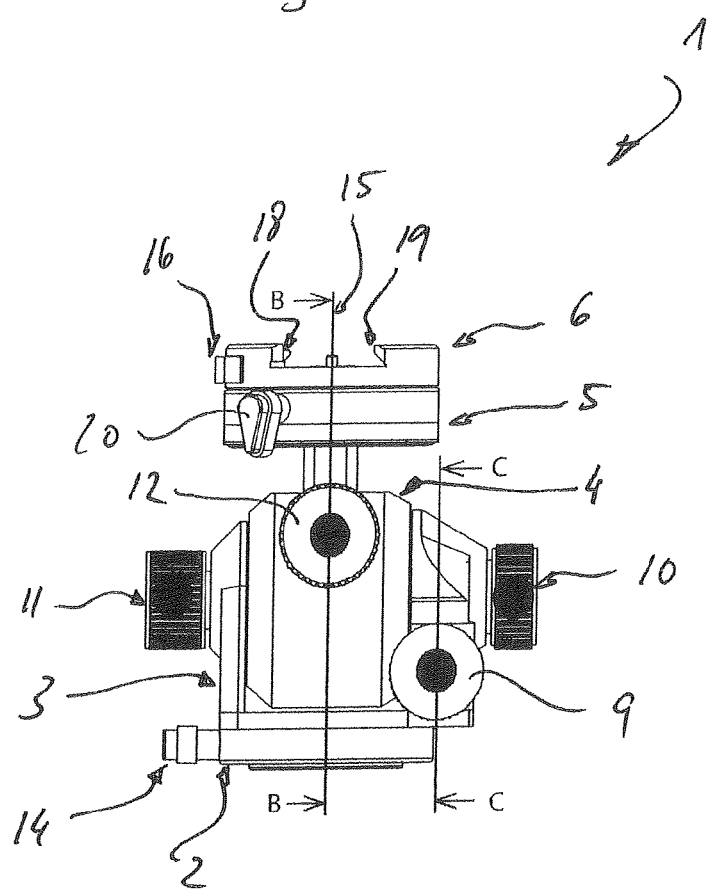
FIG. 3 is a front view of the tripod head of FIG. 1.

Fastened to the rotary plate 2 is a holding part 3 which forms a receptacle for a substantially cylindrical element 4 which is pivotable therein about a pivot axis 7. The element 4 is thus connected to the tripod via the rotary plate 2 so as to be rotatable about a vertical axis 15 (corresponding to the sectional line B-B in FIG. 3) and can itself be pivoted with respect to the holding part 3 about the pivot axis 7.

The vertical axis of rotation 15 and the pivot axis 7 extend transversely, in particular at a right angle, with respect to each other and can be adjusted in a mutually independent manner.

A second element 5 is connected on the substantially cylindrical element 4 and can be pivoted about a further pivot axis 8 with respect to the substantially cylindrical element 4.

The further pivot axis 8 and the pivot axis 7 extend transversely, in particular at a right angle, with respect to each other and the elements 4 and 5 can each be adjusted about the pivot axes 7, 8 in a mutually independent manner via a drive (see below). It is thus a geared tripod head.

Rotatably fastened to the second element 5 is a quick clamping device 6 for clamping a quick change plate (not shown) of the optical device in a guide 17. The quick change plate and the guide 17 have complementarily formed guide surfaces. The guide comprises holding elements 18, 19 which can be adjusted relative to each other and a device 16 for fixing the quick change plate is provided and is formed to adjust the mutual spacing of the holding elements 18, 19.

The optical device is thus connected to the second element 5 via the quick clamping device 6.

The quick clamping device 8 can be rotated through 360 degrees with respect to the second element 5 and can be fixed in any position via a locking lever 20.

Figure 4:
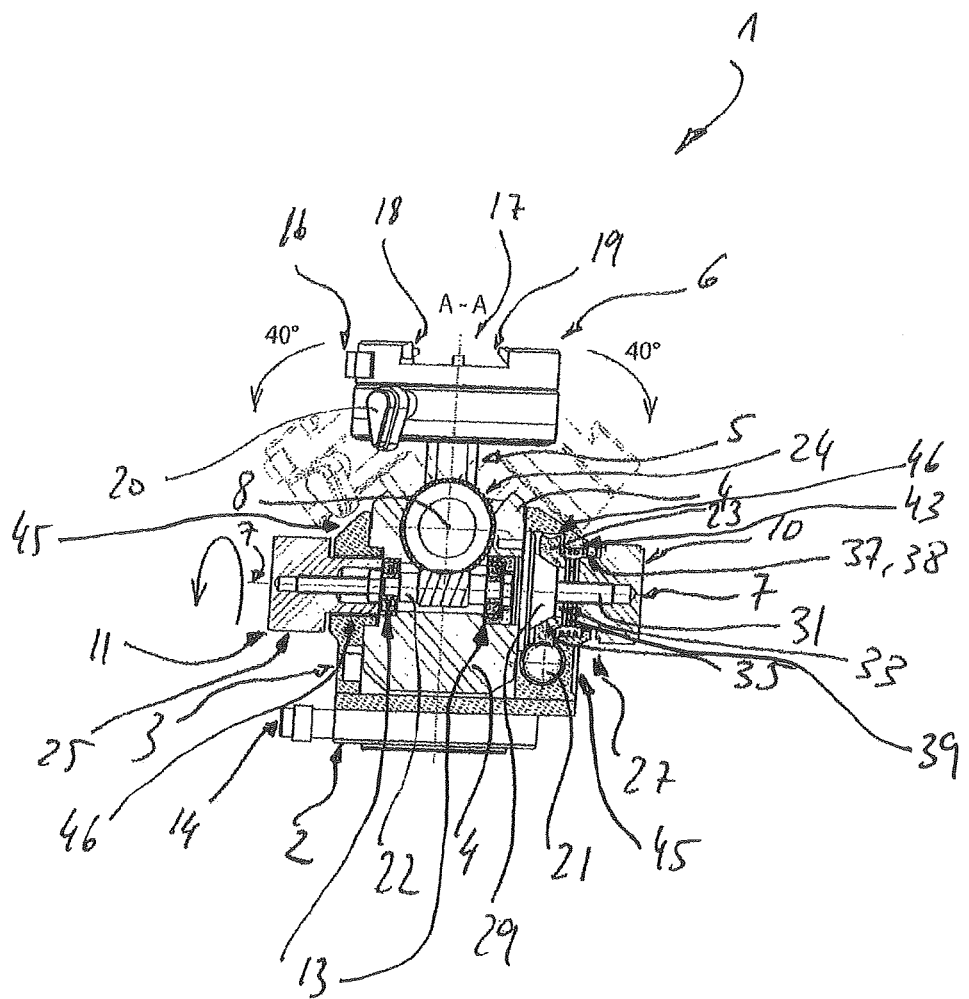
FIG. 4 is a cross-section through the tripod head along the line A-A of FIG. 2.
Figure 5:
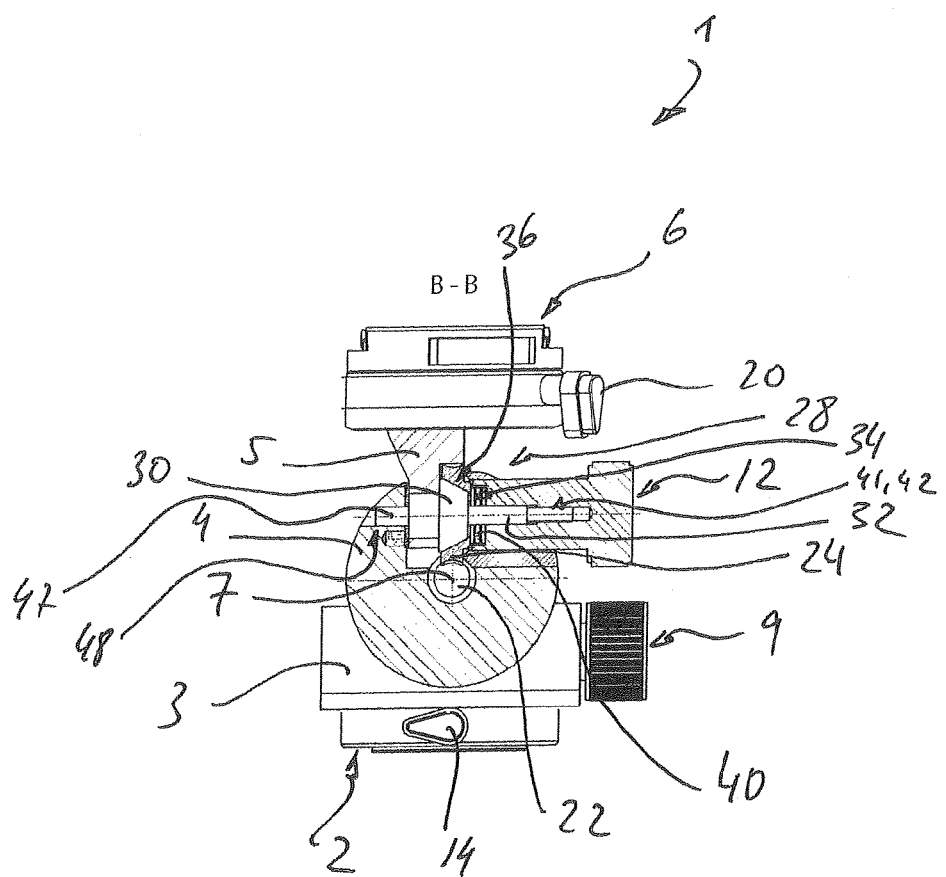
FIG. 5 is a cross-section through the tripod head along the line B-B of FIG. 3.
Figure 6:
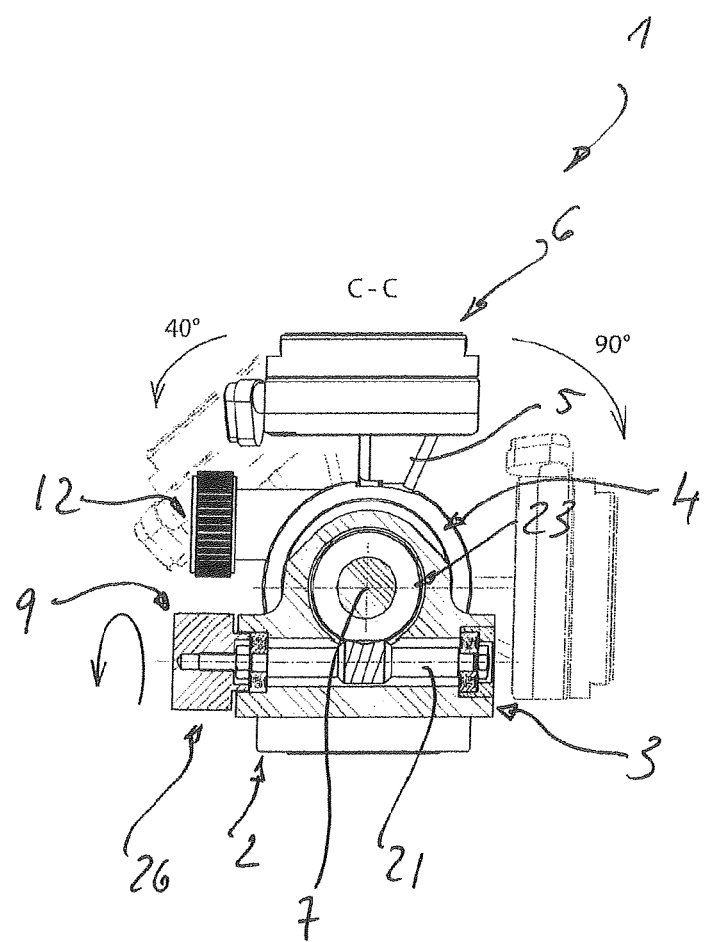
FIG. 6 is a cross-section through the tripod head along the line C-C of FIG. 3.

The pivot axis 7 and also the second pivot axis 8 are arranged in the first element 4 (cf. FIG. 4). Therefore, a particularly compact construction can be achieved by way of this nesting arrangement.

The pivot axis 7 extends through the longitudinal centre axis of the cylindrical element 4.

The elements 4 and 5 are each adjusted via a rotary button 9 or 10 which each effect a rotation of a worm 21, 22, on which a toothed wheel 23, 24 engaging therein runs or rotates. The drives 25, 26 are thus worm gears.

The respective worm 21, 22 thus acts on the respective worm wheel 23, 24 and therefore effects an adjustment of the respective element 4 or 5, since the worm wheel 23, 24 rotates about the respective pivot axis 7 or 8 and is operative connection (or can be brought into operative connection, see below) with the respective element 4 or 5.

The drive 26 of the second element 5 is almost completely received within the first element 4, i.e., the worm 22 and also the worm wheel 24 are located virtually completely within the sleeve of the cylindrical element 4. Only an insignificant, small part of the worm wheel 24 protrudes slightly.

The drive 26 for the second pivot axis 8 extends along the first pivot axis 7 and thus lies on the longitudinal centre axis of the cylindrical element 4.

The holder and thus the optical device are precisely set and oriented by way of an adjustment using the drives 25, 26.

In order for it to be possible to make a quick adjustment over larger paths, the drive function can be decoupled in each case so that a free adjustment is possible, like in the case of a ballhead. It is understood that this decoupling can then be reversed at any time at any position and the operative connection of the drives restored.

For this purpose, the drives 25, 26 are each provided with a decoupling mechanism 27, 28.

Each decoupling mechanism 27, 28 includes a cone 29, 30, connected to the element 4, 5 along the pivot axis 7, 8, having a pin 31, 32.

The respective toothed wheel 23, 24 of the drive 25, 26 comprises a central opening 33, 34 which, on the side facing towards the cone 29, 30, has an internally circumferential inclined surface 35, 36 corresponding to the cone 29, 30.

In the coupled state, the movement is hereby transmitted between the rotary button 9 or 11 via the worm 21, 22 to the toothed wheel 23, 24 and from there to the cone 29, 30.

For an improved non-positive locking connection, the internally circumferential inclined surface 35, 36 of the toothed wheel 23, 24 and the cone 29, 30 comprise mutually corresponding toothed arrangements.

However, the toothed wheel 23, 24 and the cone 29, 30 can be brought out of engagement by the decoupling mechanism 27, 28 in order to allow the free movement.

For this purpose, the cone 29, 30 and the toothed wheel 23, 24 are displaced relative to each other along the pivot axis 7, 8.

In order to effect this, the pin 31, 32 in each case engages through the toothed wheel 23, 24 and, on the side facing away from the cone 29, 30, engages into a control button 10, 12.

The cone and the pin in the case of the decoupling mechanism of the drive 25 for the first element are formed by the element 4 itself.

In order to bring the toothed wheel 23, 24 into or out of engagement with the cone 29, 30, the toothed wheel 23, 24 is displaced relative to the cone 23, 24. For this purpose, the control button 10, 12 is adjusted by rotating in its position for actuation on the pin 31, 32, wherein the control button 10, 12 acts on the toothed wheel 23, 24 with its end surface.

A rotation of the control button 10, 12 effects a displacement of the toothed wheel 23, 24 along the respective axis 7 or 8.

For this purpose, the control button 10 engages with a thread 37 on its inner surface into a thread 38 on the outer circumference of the pin 31. A rotation of the control button 10 thus effects a displacement of its longitudinal position along the pin 31 which is thus a threaded spindle. The control button 10 and the toothed wheel 23 are connected to each other in a rotatable manner via a bearing 39. Therefore, the toothed wheel 23 can rotate about the axis 7 when the drive 25 is actuated.

In a similar manner, the control button 12 engages with a thread 42 on its inner surface into a thread 41 on the outer circumference of the pin 32 which is thus a threaded spindle. A rotation of the control button 12 thus effects a displacement of its longitudinal position along the pin 32. The control button 12 and the toothed wheel 24 are thus connected so as to be rotatable with respect to each other via a bearing 40. Therefore, the toothed wheel 24 can rotate about the axis 8 when the drive 26 is actuated.

The first element 4 is supported in the holding part 3 via lateral protrusions 45 which comprise apertures 46, disposed concentrically around the pivot axis 7, for the engagement of the rotary button 11 or the control button 10. The rotary button 11 or control button 10 then lie in the apertures 46. The actual support of the first element 4 is thus effected on the one hand on bearings 13 disposed on the left and right of the worm 22 and thus via the connected rotary button 11. On the other hand, the support is effected via a further bearing 43 which is disposed on the side of the control button 10 and via which the control button 10, the bearing 39 and the toothed wheel 23 are supported together in the aperture 46.

The second element 5 is supported in the first element 4 on the one hand via the spindle 32 in the control button 12 and on the other hand via a cylindrical protrusion 47 which rests in a corresponding bore 48 in the first element 4.

If, instead of the toothed wheel 23, 24, a similar friction wheel is used in each case and the drives 25, 26 are removed, then the "remodelling" produces a merely freely adjustable tripod head and not a geared tripod head.

It is thus clear that the decoupling mechanisms and the locking mechanisms can correspond with each other with the exception of the toothed wheel/friction wheel.

The friction wheel can be identical to the toothed wheel 23, 24 or can be designed in a simpler manner, i.e., without teeth, owing to the lack of a drive function.

LIST OF REFERENCE NUMERALS

1 Tripod head
2 Rotary plate
3 Holding part
4 Element
5 Element
6 Quick clamping device
7 Pivot axis
8 Pivot axis
9 Rotary button
10 Control button
11 Rotary button
12 Control button
13 Bearing
14 Locking lever
15 Vertical axis
16 Device
17 Guide
18 Holding element
19 Holding element
20 Locking lever
21 Worm
22 Worm
23 Toothed wheel
24 Toothed wheel
25 Drive
26 Drive
27 Decoupling mechanism
28 Decoupling mechanism
29 Cone
30 Cone
31 Pin
32 Pin
33 Central opening
34 Central opening
35 Inclined surface
36 Inclined surface
37 Thread
38 Thread
39 Bearing
40 Bearing
41 Thread
42 Thread
43 Bearing
45 Protrusions
46 Apertures
47 Protrusion
48 Bore

The invention claimed is:

1. A holder for an optical device for changing the orientation of the optical device, said holder comprising: a first component having a first pivot axis for connecting to a tripod and a second component having a second pivot axis for connecting to the optical device, wherein the first and second pivot axes extend transversely with respect to each other and the first and second components can be adjusted in a mutually independent manner about their respective pivot axes, wherein the first pivot axis is arranged in the first component and the second pivot axis is likewise arranged in the first component, and wherein the first component can be connected to the tripod via a third component having a third pivot axis, the second component is mounted to be pivotable about the second pivot axis in the first component and the first component is mounted to be pivotable about the first pivot axis in the third component, and wherein the first component is a cylindrical component, the first pivot axis extends through the longitudinal centre axis of the cylindrical component and a drive for the second pivot axis lies on the longitudinal centre axis of the cylindrical component.

2. The holder of claim 1 further including a drive associated with the first component and a drive associated with the second component, and wherein via said drives the first and second components can be adjusted about the respective first and second pivot axes in a mutually independent manner.

3. The holder of claim 2, wherein the drive for the second pivot axis extends along the first pivot axis.

4. The holder of claim 3, wherein the drives are formed by worm gears which comprise a worm which acts on a worm wheel which rotates about the respective pivot axis.

5. The holder of claim 4, wherein the drives are provided in each case with a decoupling mechanism.

6. The holder of claim 5, wherein each decoupling mechanism includes a cone, connected to the component along the pivot axis, having a pin, wherein the worm wheel of the drive has a central opening which, on the side facing towards the cone, has an internally circumferential inclined surface corresponding to the cone and the pin engages through the worm wheel and engages into a control button on the side facing away from the cone, which button displaces the toothed wheel and the cone relative to one another to bring the worm wheel into or out of engagement with the cone.

7. The holder of claim 6, wherein the pin in the case of the decoupling mechanism of the drive for the second component is a spindle.

8. The holder of claim 6, wherein the cone and the pin in the case of the decoupling mechanism of the drive for the first component are formed by the component itself.

9. The holder of claim 6, wherein the internally circumferential inclined surface of the toothed wheel and the cone are provided with mutually corresponding toothed arrangements.

10. The holder of claim 1, wherein the first and second components are each provided with a locking mechanism which includes a cone, connected to the component along the pivot axis, having a pin and includes a friction wheel, wherein the friction wheel has a central opening which, on the side facing towards the cone, has an internally circumferential inclined surface corresponding to the cone and the pin engages through the friction wheel and engages into a control button on the side facing away from the cone, which button displaces the cone and the friction wheel relative to one another to bring the friction wheel into or out of engagement with the cone.

11. The holder of claim 10, further including a drive associated with the first component and a drive associated with the second component, and wherein via said drives the first and second components can be adjusted about the respective first and second pivot axes in a mutually independent manner.

12. The holder of claim 1, wherein the first and second pivot axes extend at a right angle with respect to each other.

13. The holder of claim 2, wherein the drives are formed by worm gears which comprise a worm which acts on a worm wheel which rotates about the respective pivot axis.

14. The holder of claim 2, wherein the drives are provided in each case with a decoupling mechanism.

15. The holder of claim 14, wherein the drive for the second pivot axis extends along the first pivot axis.

16. The holder of claim 14, wherein each decoupling mechanism includes a cone, connected to the component along the pivot axis, having a pin, wherein the worm wheel of the drive has a central opening which, on the side facing towards the cone, has an internally circumferential inclined surface corresponding to the cone and the pin engages through the worm wheel and engages into a control button on the side facing away from the cone, which button displaces the toothed wheel and the cone relative to one another to bring the worm wheel into or out of engagement with the cone.

17. The holder of claim 16, wherein the pin in the case of the decoupling mechanism of the drive for the second component is a spindle.

18. The holder of claim 16, wherein the cone and the pin in the case of the decoupling mechanism of the drive for the first component are formed by the component itself.

* * * * *